(12) United States Patent
Hirose

(10) Patent No.: US 6,249,367 B1
(45) Date of Patent: Jun. 19, 2001

(54) OPTICAL APPARATUS

(75) Inventor: Kenji Hirose, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/386,163

(22) Filed: Aug. 31, 1999

(30) Foreign Application Priority Data

Sep. 4, 1998 (JP) ................................................. 10-267326

(51) Int. Cl.[7] .................................................... G02B 26/08
(52) U.S. Cl. .......................... 359/210; 359/212; 359/223; 359/813; 359/872
(58) Field of Search ................................... 359/210, 211, 359/212, 223, 813, 814, 872, 226

(56) References Cited

U.S. PATENT DOCUMENTS

| | | | |
|---|---|---|---|
| 4,436,260 | * | 3/1984 | Donelan ................................. 244/3.16 |
| 5,430,571 | * | 7/1995 | Witteveen .............................. 359/211 |
| 5,779,187 | * | 7/1998 | Dulat et al. ............................ 359/226 |

FOREIGN PATENT DOCUMENTS 8-229759 * 9/1996 (JP) .

* cited by examiner

*Primary Examiner*—Cassandra Spyrou
*Assistant Examiner*—Euncha Cherry
(74) *Attorney, Agent, or Firm*—Fitzpatrick, Cella, Harper & Scinto

(57) ABSTRACT

An optical apparatus of the present invention is characterized by having a stationary portion, a movable portion having an optical member and a semi-cylindrical shape, the movable portion being rotationally movable relative to the stationary portion, a hydrostatic bearing for supporting a semi-cylindrical surface of the movable portion without contact with the stationary portion, and an actuator for actuating the movable portion relative to the stationary portion without contact therewith in a direction of rotation. The optical member is supported and driven in a non-contact state, so as to reduce positional deviation of rotation center of the optical member and decrease friction torque, thereby providing the optical apparatus that can act at high accuracy and at high speed.

8 Claims, 5 Drawing Sheets

OPTICAL APPARATUS

BACKGROUND OF THE INVENTION

1. Field of the Invention

The present invention relates to an optical apparatus such as a galvanometer mirror actuator or the like for rotationally driving an optical member to reflect or diffractively deflect light.

2. Related Background Art

In recent years there have been increasing needs for the machining technology for scanning with a light beam, such as a laser or the like, or for positioning it with high accuracy to utilize the laser energy such as in a laser marker or a stereo lithography device, and there are also known devices for deflecting a laser beam at high speed to draw an image, such as laser displays.

These devices are arranged to rotationally drive an optical member such as a reflection mirror or a diffraction grating to deflect or move the optical axis of the beam to a desired position, and various galvanometer mirror actuators may be used as driving devices for rotationally driving the optical member. Among these galvanometer mirror actuators, there are actuators for rotationally rocking the optical member only in a certain angular range according to use, and there are increasing demands for higher drawing or positioning accuracy and for quicker operation performance.

A conventional galvanometer mirror actuator has the structure as illustrated in FIGS. 5A, 5B to FIG. 7. In FIGS. 5A, 5B to FIG. 7, a reflection mirror 101 is supported on a plate spring 102 held on a base member 105 so as to be rotatable via neck portions 102a of the spring 102, and a pair of magnets 103 and a yoke 104 are attached to the lower surface of the reflection mirror 101. The magnets 103, together with the yoke 104 and base member 105, constitute a magnetic circuit. Attached to the base member 105 is a coil 106 for rotationally driving the reflection mirror 101 in cooperation with the magnets 103.

In this structure, when a current is supplied to the coil 106, a rotation movement is generated to twist the neck portions 102a of the plate spring 102 supporting the reflection mirror 101 to rotate the reflection mirror 101, thereby deflecting a beam incident to the reflection mirror 101. The center of rotation at this time is a point P in the neck portions 102a of the plate spring 102 as illustrated in FIG. 7.

In addition to the above structure, there are also known galvanometer mirror actuators using antifriction bearings such as ball bearings or the like as holding and rotation guiding means for the reflection mirror.

The conventional galvanometer mirror actuators described above, however, have the following issues to be solved.

(1) In the galvanometer mirror actuators having the structure for supporting the driven part by the plate spring, because the neck portions of the plate spring have a certain width, variations in the width and plate thickness make it hard to define the center of rotation of the driven part at a predetermined position. Since the plate spring undergoes twist deformation, the rigidity thereof is also degraded in directions except for the twist rotation directions. If the center of gravity of the driven part moves during the rotation because of the degradation of rigidity, the center of rotation will also move under the influence thereof, so as to produce such errors as an angular error of the reflected beam, offset deviation thereof, and so on, thereby degrading the positioning performance.

(2) In the galvanometer mirror actuators having the structure for supporting the driven part by antifriction bearings, while the radial rigidity can be kept high, continuous execution of fine feed operations will induce a shift in the positional relation between balls and a retainer of the bearing to increase a rotational friction torque suddenly, thereby degrading controllability. Since continuous execution of rotational rocking operations in a fixed angular range will bring about local deficiency of oil film in the bearing and tend to damage the bearing, this structure will need an oil feeding mechanism, periodic oil feeding, etc. and the apparatus will increase its scale and necessitate maintenance.

SUMMARY OF THE INVENTION

The present invention has been accomplished in view of the unsolved issues in the prior art as described above, and an object of the invention is to provide an optical apparatus capable of implementing high-accuracy and high-speed operation in a maintenance-free and compact structure.

For solving the above problems, an optical apparatus of the present invention comprises a stationary portion, a movable portion having an optical member and a semi-cylindrical shape, said movable portion being rotationally movable relative to the stationary portion, a non-contact static bearing for supporting a semi-cylindrical surface of the movable portion, and a non-contact actuator for actuating the movable portion relative to the stationary portion therewith in a direction of rotation.

The actuator desirably comprises a magnet and a coil. In this case, it is preferable to dispose the magnet on the movable portion side and the coil on the stationary portion side. The semi-cylindrical shape provided in the movable portion is better formed on a surface of the magnet disposed on the movable portion side.

The stationary portion is desirably comprised of a magnetic material and the magnet disposed on the movable portion side desirably generates an attraction force between the movable portion and the stationary portion.

The apparatus desirably further comprises a preload mechanism for generating an attraction force between the movable portion and the stationary portion.

The optical member is desirably a mirror for reflecting or diffractively deflecting a light beam and a center axis of the rotation is better located substantially on a surface of the mirror.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will now be described in detail in accordance with the accompanying drawings.

Figure 1A:
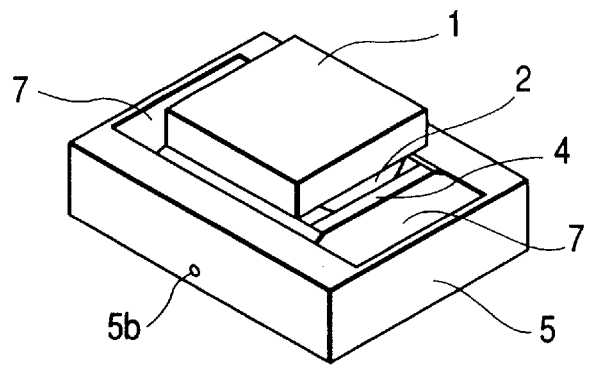
FIG. 1A is a perspective view of an embodiment of the galvanometer mirror actuator of the present invention.
Figure 1B:
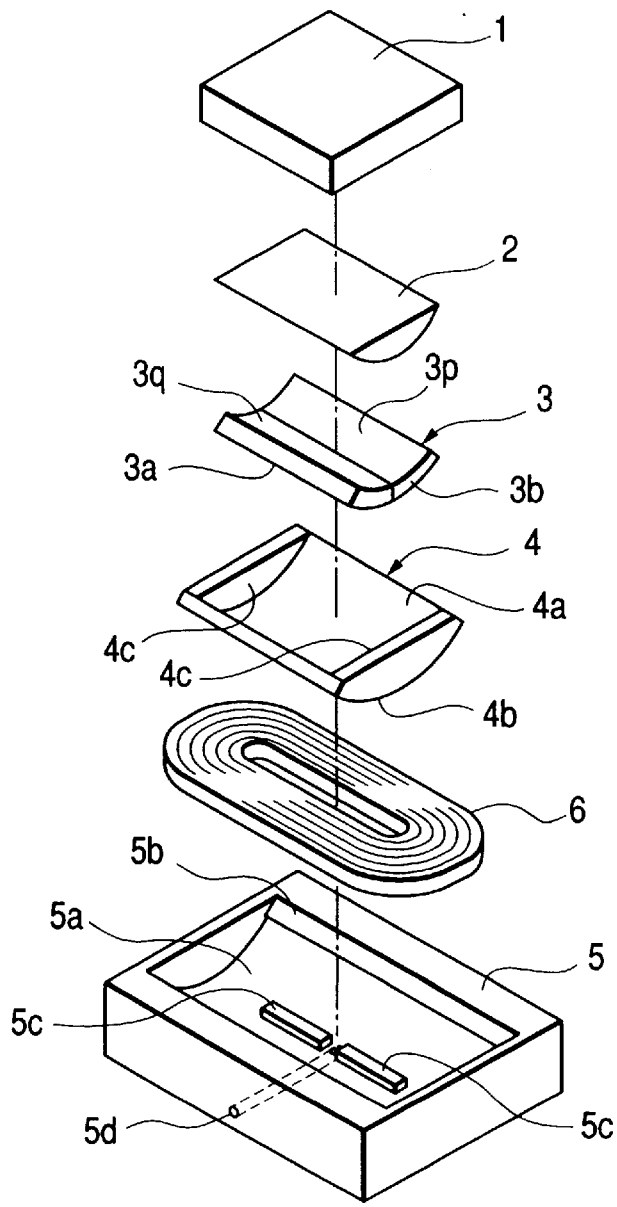
FIG. 1B is an exploded perspective view thereof.
Figure 2:
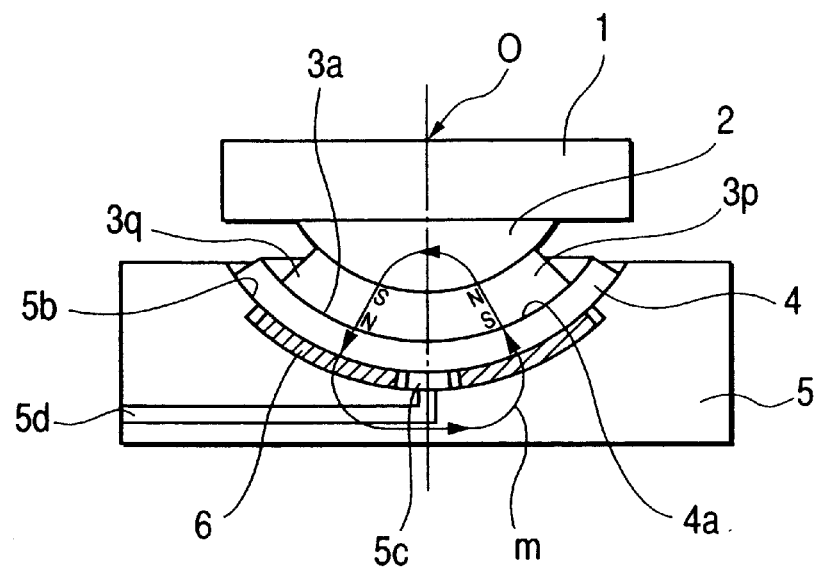
FIG. 2 is a schematic, sectional diagram of a major part of the galvanometer mirror actuator of FIG. 1A.
Figure 3:
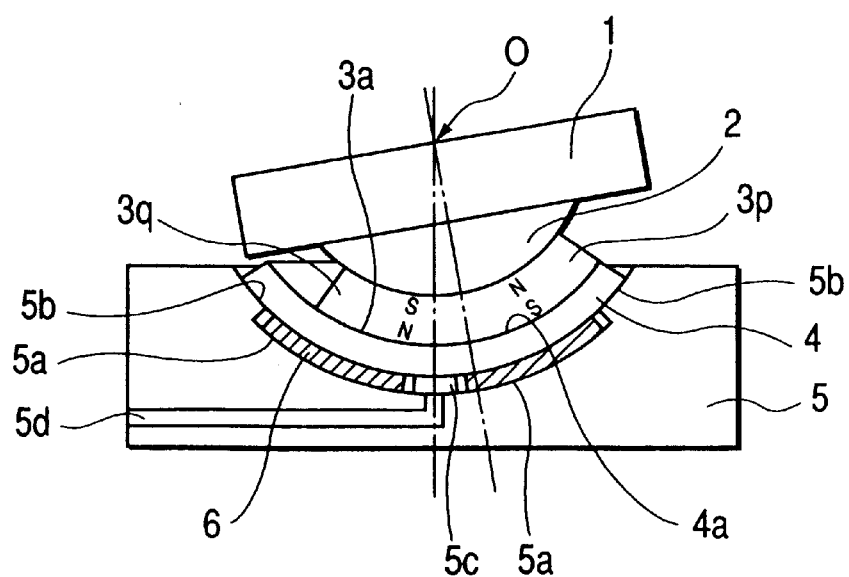
FIG. 3 is a schematic, sectional diagram of a major part for explaining the operation of the galvanometer mirror actuator of FIG. 1A.

FIG. 1A is a perspective view of an embodiment of the galvanometer mirror actuator of the present invention, FIG. 1B is an exploded perspective view thereof, FIG. 2 is a sectional view of a major part of the galvanometer mirror actuator illustrated in FIG. 1A, and FIG. 3 is a sectional view of a major part for explaining the operation of the galvanometer mirror actuator illustrated in FIG. 1A.

In FIGS. 1A, 1B to FIG. 3, reference numeral 1 designates a reflection mirror as an optical member, which is fixed to an upper surface of a retaining member 2, and the retaining member 2 is made of a magnetic material, because it is also utilized as a magnetic circuit as described hereinafter. Permanent magnets 3p and 3q for driving the reflection mirror 1 are fixed in parallel to a lower surface of the retaining member 2, and an outer (lower) surface 3a of a permanent magnet 3 composed of these permanent magnets 3p and 3q is formed in a semi-cylindrical shape. The semi-cylindrical surface 3a is formed so that the center O of curvature thereof is located on the front surface of the reflection mirror 1 (see FIG. 2 and FIG. 3). This center O of curvature located on the front surface of the reflection mirror 1 acts as a center axis of the movable portion side as illustrated in FIG. 3. The semi-cylindrical surface 3a of the permanent magnet 3 is a mirror-finished surface and both end faces 3b, 3b of the permanent magnet 3 in the axial direction are also mirror-finished surfaces for positional restriction in the axial direction. Although in the present embodiment the outer surface of the permanent magnet 3 is formed in the semi-cylindrical shape, it can also be contemplated that a member having a semi-cylindrical outer surface is prepared as a separate member and this is fixed to the lower surface of the permanent magnet.

Numeral 4 denotes an air bearing (non-contact bearing) made of a porous material and having a bearing surface 4a recessed in the semi-cylindrical shape. This air bearing 4 is made of the porous material so that it allows compressed air supplied from the side of back surface 4b to permeate out of the bearing surface 4a. The air bearing 4 forms an air film of the compressed air thus supplied on the bearing surface 4a to rotationally guide the permanent magnet 3. In addition, the air bearing 4 also forms an air film on its internal surfaces 4c, at the axial ends to regulate axial displacement of the two end surfaces 3b of the semi-cylindrical permanent magnet 3. The porous material of the air bearing 4 used in the present embodiment is a porous material such as graphite or the like.

Numeral 5 represents a base member for retaining the air bearing 4, and a coil 6 for driving the reflection mirror 1 in cooperation with the permanent magnet 3, which is fixed in a space between the base member 5 and the air bearing 4. The base member 5 is made of a magnetic material in order to compose a magnetic circuit, together with the retaining member 2 and the permanent magnet 3. In the base member 5, a recess 5a is formed for receiving the coil 6. Further formed are side retaining surfaces 5b for retaining both side portions of the back surface 4b of the air bearing 4 and center retaining surfaces 5c for retaining the central part of the back surface 4b of the air bearing 4 at the position where a center hole of the coil 6 is located. An air supply hole 5d for supplying the compressed air from the outside to the back surface 4b of the air bearing 4 is formed so as to be open between the center retaining surfaces 5c. Then the coil 6 is fixed in the recess 5a of the base member 5 and the air bearing 4 is placed on the side retaining surfaces 5b and the center retaining surfaces 5c. When the compressed air is supplied from the outside through the air supply hole 5d, the compressed air passes clearances among the base member 5, the coil 6, and the air bearing 4 to penetrate the porous air bearing 4 from the back surface 4b thereof and come out of the bearing surface 4a and the inside surfaces 4c at the axial ends, thereby forming the air film on these surfaces. In FIG. 1A, numeral 7 designates a sealing member for sealing the base member 5 so as to prevent the compressed air thus supplied from leaking from portions other than the air bearing 4 to the outside.

In the galvanometer mirror actuator constructed as described above, the permanent magnet 3 composed of the two permanent magnets 3p, 3q placed in parallel is arranged, for example as illustrated in FIG. 2, so that one permanent magnet 3p has the pole N on the surface opposed to the retaining member 2 and the pole S on the surface opposed to the air bearing 4. Also the other permanent magnet 3q has the pole S on the surface opposed to the retaining member 2 and the pole N on the surface opposed to the air bearing 4 to the contrary. Thus, the permanent magnet 3, together with the retaining member 2 and the base member 5 made of the magnetic material, composes the magnetic circuit m as indicated by arrows in FIG. 2.

Figure 4:
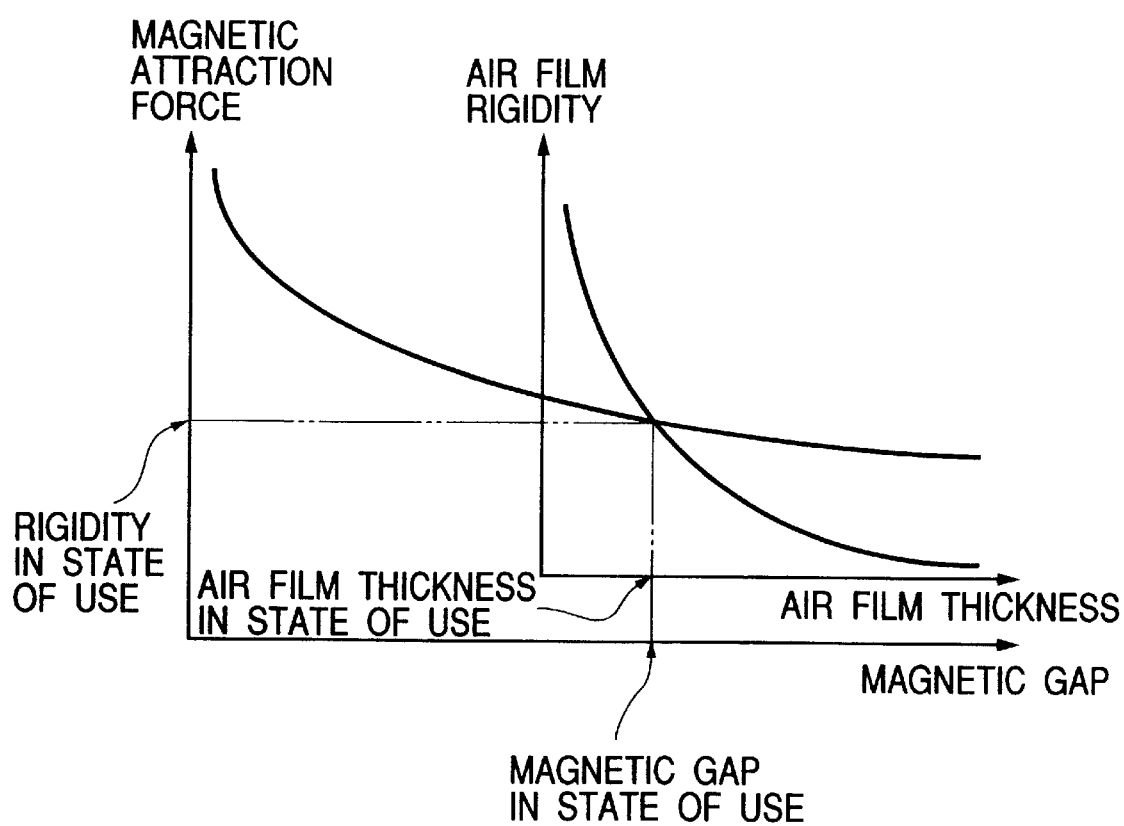
FIG. 4 is a graph for explaining the relationship between air film rigidity and magnetic force of an air bearing in an embodiment of the galvanometer mirror actuator of the present invention.
Figure 5A:
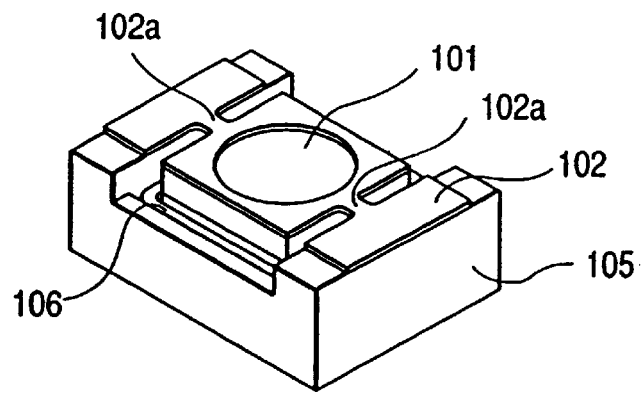
FIG. 5A is a perspective view of the conventional galvanometer mirror actuator.
Figure 5B:
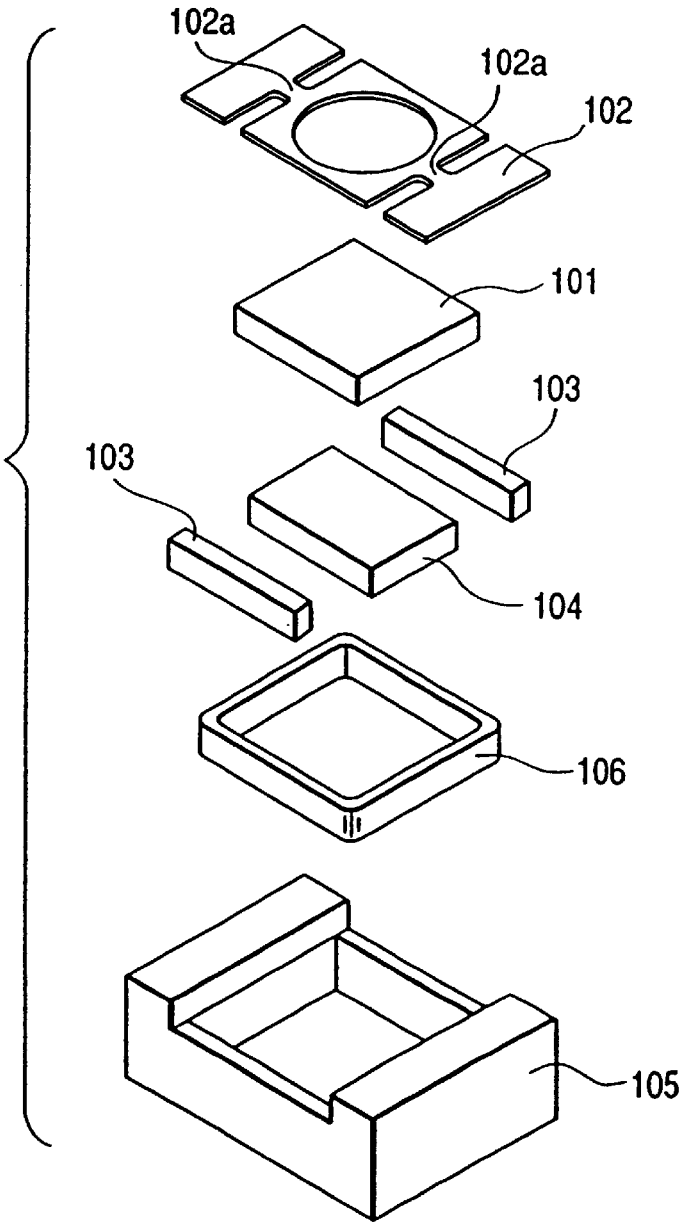
FIG. 5B is an exploded perspective view thereof.
Figure 6:
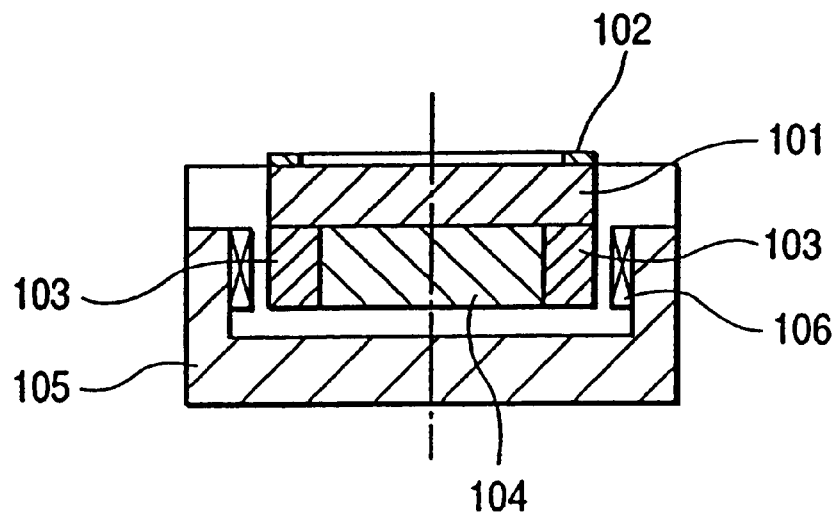
FIG. 6 is a schematic, sectional diagram of a major part for explaining the operation of the conventional galvanometer mirror actuator of FIG. 5A.
Figure 7:
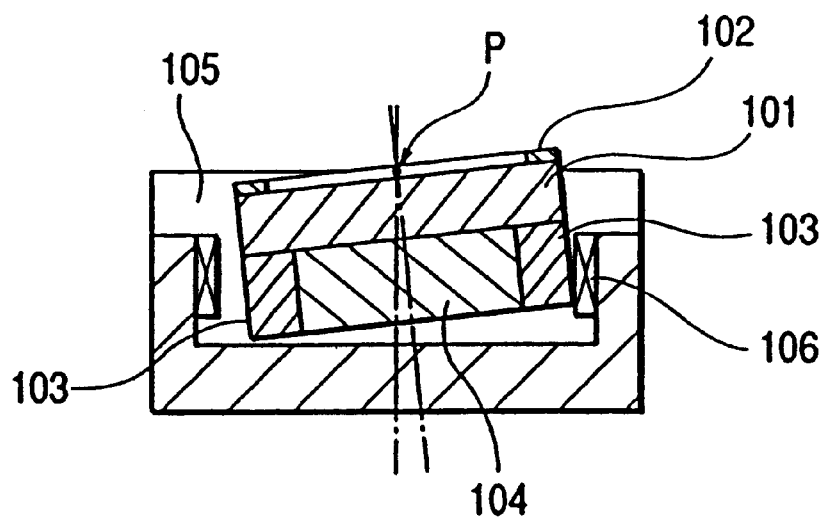
FIG. 7 is a schematic, sectional diagram of a major part for explaining the operation of the conventional galvanometer mirror actuator of FIG. 5A.

Incidentally, the permanent magnet 3 and the air bearing 4 are apt to attract and closely fit each other by the action of the magnetic attraction force between the permanent magnet 3 and the base member 5. However, the air film is formed between the permanent magnet 3 and the air bearing 4 by the compressed air coming out of the entire surface of the bearing surface 4a of the air bearing 4, based on the supply of the compressed air. The thickness of the air film has such characteristics of air film rigidity versus air film thickness that the rigidity in the thickness direction increases quickly as the thickness approaches 0, as illustrated in 4; however, when separated from each other by increasing the thickness of the air film, is done against the magnetic attraction force. This magnetic attraction force has relatively gentle characteristics of magnetic attraction force versus magnetic gap in the range of air film thicknesses, as illustrated in FIG. 4. The magnetic gap stated herein means a space between the permanent magnet and the base member. The thickness of the air film can be maintained at a certain value and the air bearing can be obtained with high bearing rigidity in the radial directions, by properly setting the magnetic gap so as to balance the magnetic attraction force with the desired air film rigidity. Further, by properly keeping the clearance between both end faces 3b of the permanent magnet 3 and the end internal surfaces 4c of the air bearing 4, the air film can regulate the displacement in the thrust directions with high rigidity. This thickness of the air film can be suitably set according to the pressure of the supplied air or the purpose of use, and it is normally set to approximately 2 to 5 μm.

Now let us explain the operation of the galvanometer mirror actuator of the present invention. The permanent magnet 3 is arranged in the magnetic pole arrangement as illustrated in FIG. 2, as stated above, and, together with the retaining member 2 and the base member 5, composes the magnetic circuit m as indicated by the arrows in FIG. 2. When an electric current is allowed to flow in the coil 6 placed between the permanent magnet 3 (3p and 3q) and the base member 5, the permanent magnet 3 is subject to a force in a direction perpendicular to the magnetic path. Since the displacement is regulated in the radial direction by the magnetic force and the air film, the semi-cylindrical surface 3a of the permanent magnet 3 rotates along the bearing surface 4a of the air bearing 4, as illustrated in FIG. 3. At this time, the rocking operation is accomplished on a very smooth basis, because the air bearing 4 has no mechanical contact portion at all. Since the movable part is held by the air film having the high rigidity, the rotation axis has little deviation. This realizes good repeatability of the rotational position of the reflective surface of the reflection mirror 1 and the rotation axis center of the movable part can be always kept at a point of the illustrated point O in FIG. 2 and FIG. 3 during the rotation. The surface of the magnet and the surface of the bearing surface can be obtained in good machining accuracy of the sub-micron to micron order by machining the surfaces by cylinder polishing and internal cylinder polishing using a polishing machine adapted to rotate a work or a grinding stone or the like.

As described above, the galvanometer mirror actuator of the present embodiment can have the enhanced bearing rigidity by use of the preload by the permanent magnet, and the air bearing, so as to decrease the deviation of the rotation axis center of the reflection mirror, thereby suppressing the angular error and offset of the reflected beam and improving the accuracy of the reflection angle of the reflected beam. Since the bearing, the driving portion, and the preload are kept in a perfectly non-contact state, the smooth rotational friction torque characteristic can be maintained. Therefore, controllability is good from the fine feed operation to the high-speed rocking operation and no maintenance is required at all.

Further, since in the present embodiment the magnet for driving is used as a part of the bearing and also as a preload means, it contributes to decreasing the number of parts and reducing the size of the actuator. Since the bearing structure on the stationary side is open in the radial direction, the parts can be assembled from one direction, so that the assembling operability is extremely good.

The structure of the embodiment of the present invention described above permits the rotating part to be retained and guided in the non-contact manner. Further, the bearing rigidity is enhanced by the permanent magnet and the movable part having the optical member is urged to the air bearing; whereby the non-contact retention and guide of the rotating part can be realized by the air film of the constant thickness balanced with the magnetic preload. Also, deviation of the rotation axis center of the optical member such as the reflection mirror or the like can be decreased. This increases the rotation accuracy and improves the angle error and offset of the reflected beam, as compared with the conventional plate spring support method.

Since the bearing and driving portions and the preload are kept in the non-contact state, the smooth rotational friction torque characteristic can be maintained and thus the controllability is good from the fine feed operation to the quick rocking operation; therefore, the actuator can be used semi-permanently without need for maintenance.

Further, the assembly can be carried out from one direction and, therefore, the assembling operability is good.

Since the surface of the permanent magnet is formed in the semi-cylindrical shape, there is no need for a separate member forming the semi-cylindrical surface, which can decrease the number of parts and the size of the actuator.

What is claimed is:

1. An optical apparatus comprising:

a stationary portion;

a movable portion having an optical member and a semi-cylindrical shape, said movable portion being rotationally movable relative to said stationary portion;

a non-contact static bearing for supporting a semi-cylindrical surface of said movable portion; and non-contact actuator for actuating said movable portion relative to said stationary portion in a direction of rotation; and a preload mechanism for generating an attraction force between said movable portion and said stationary portion.

2. The optical apparatus according to claim 1, wherein said actuator comprises a magnet and a coil.

3. The optical apparatus according to claim 2, wherein said magnet is disposed on a side of said movable portion and said coil is disposed on a side of said stationary portion.

4. The optical apparatus according to claim 3, wherein the semi-cylindrical shape of said movable portion is formed in a surface of said magnet provided in said movable portion.

5. The optical apparatus according to claim 3, wherein said stationery portion is comprised of a magnetic material.

6. The optical apparatus according to claim 5, wherein said magnet disposed on the side of said movable portion generates an attraction force between said movable portion and said stationary portion.

7. The optical apparatus according to claim 1, wherein said optical member is a mirror for reflecting or diffractively deflecting a light beam.

8. The optical apparatus according to claim 7, wherein a center axis of the rotation is located substantially on a surface of said mirror.

* * * * *

UNITED STATES PATENT AND TRADEMARK OFFICE
CERTIFICATE OF CORRECTION

PATENT NO. : 6,249,367 B1
DATED : June 19, 2001
INVENTOR(S) : Kenji Hirose

Page 1 of 1

It is certified that error appears in the above-identified patent and that said Letters Patent is hereby corrected as shown below:

Column 3,
Line 60, "4c," should read -- 4c --.

Column 4,
Line 11, "5dfor" should read -- 5d for --.
Line 34, "Also" should read -- Also, --; and
Line 53, "is" should read -- it is --.

Column 6,
Line 28, "non-contact" should read -- a non-contact --.

Signed and Sealed this

Twenty-sixth Day of February, 2002

Attest:

Attesting Officer

JAMES E. ROGAN
Director of the United States Patent and Trademark Office